United States Patent [19]

Tuckman

[11] Patent Number: 5,118,178
[45] Date of Patent: Jun. 2, 1992

[54] CORRECTIVE LENSES

[76] Inventor: Greg R. Tuckman, 633 W. Southern Ave. #1188, Tempe, Ariz. 85282

[21] Appl. No.: 550,126

[22] Filed: Jul. 9, 1990

[51] Int. Cl.⁵ .............................................. G02C 7/08
[52] U.S. Cl. ...................................... 351/57; 351/58
[58] Field of Search .................. 351/41, 44, 47, 57, 351/58, 59, 158, 61

[56] References Cited

U.S. PATENT DOCUMENTS

| | | | |
|---|---|---|---|
| 3,379,487 | 4/1968 | Amundsen | 351/58 |
| 3,446,548 | 5/1969 | Rummel et al. | 351/58 |
| 4,451,127 | 5/1984 | Moffitt, Jr. | 351/61 |

Primary Examiner—Paul M. Dzierzynski
Attorney, Agent, or Firm—Jordan M. Meschkow; Don J. Flickinger; Lowell W. Gresham

[57] ABSTRACT

Corrective lenses are provided for allowing an individual to clearly view material located at or above eye level, and a distance of approximately 508 mm (20 inches) to approximately 635 mm (25 inches) away. In a first embodiment of the invention, the lenses are in the form of snap-on, flip-up modifying lenses for mounting over the fixed lenses of a conventional pair of eyeglasses. When in the flipped-down position, the modifying lenses cover slightly more than the upper half of the fixed lenses, and the optical center of each modifying lens is horizontally and vertically aligned with the optical center of the corresponding fixed lens. In a second embodiment of the invention, designed for individuals who don't ordinarily wear glasses, the lenses are fixed within a conventional eyeglass frame. The height of the lenses is slightly more than half the height of conventional glasses, so that only the upper portion of a wearer's field of vision is covered.

10 Claims, 1 Drawing Sheet

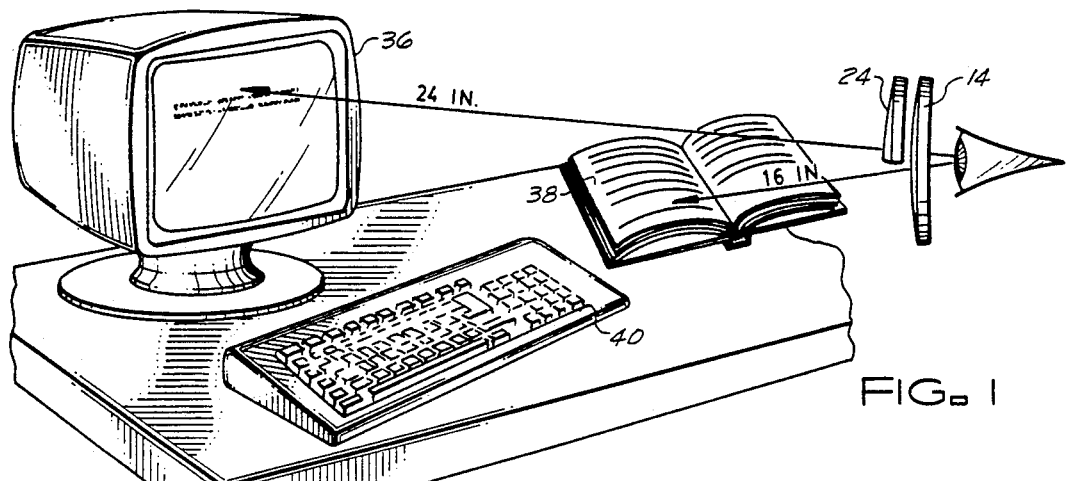
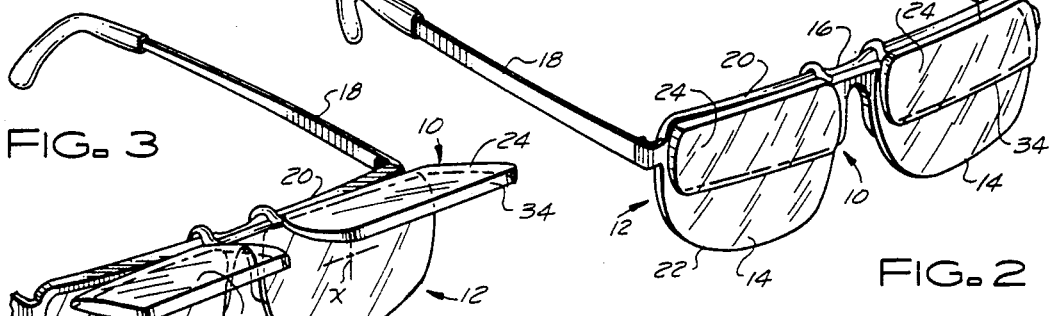
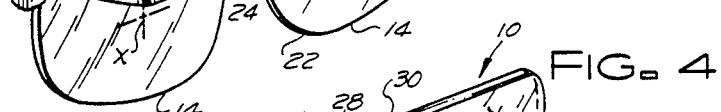
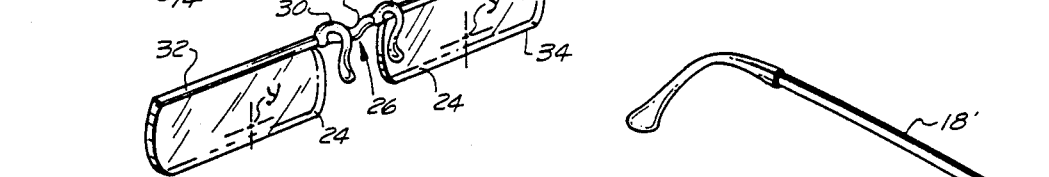
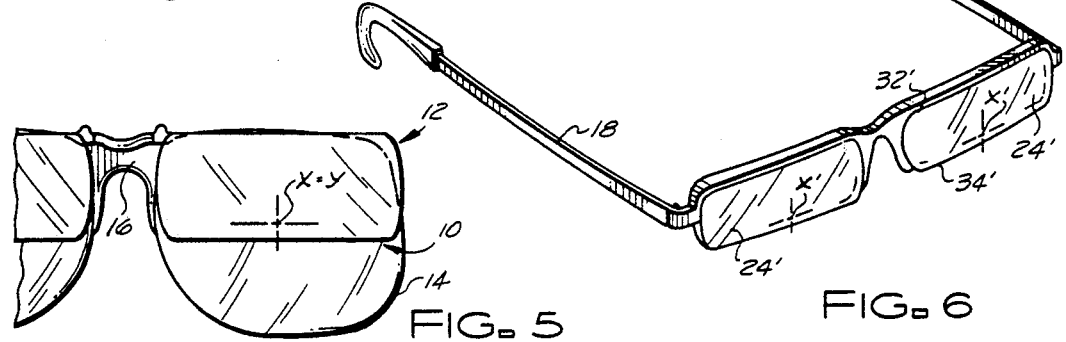

CORRECTIVE LENSES

BACKGROUND OF THE INVENTION

1. Field of the Invention

This invention relates to the art of optometry.

More particularly, this invention relates to corrective lenses for viewing computers and other applications involving close-range work in the upper field of vision.

In a further and more specific aspect, the instant invention concerns a clip-on close range adapter to be worn over a pair of conventional eyeglasses, reading glasses, or bifocals.

2. Description of the Prior Art

Nearly all individuals whose occupations or hobbies involve large amounts of reading or other close work will, at some point in their lives, require corrective lenses to combat blurred vision, headaches, tired eyes, and other symptoms of eyestrain. Severely nearsighted, or myopic, and farsighted, or hyperopic, individuals typically begin to wear such lenses at a relatively young age, and require more and more correction as they get older. It is also common for these individuals to wear bifocal lenses, wherein the upper portion of each lens corrects for long and intermediate range vision, and the lower portion of the lens is suitable for close range, or near-point, vision. According to standard optometric procedure, the prescription for the lower portion of the lens is based on a working distance of 406.4 mm (16 inches).

Even emmetropes, individuals who have "perfect 20/20" vision, may eventually become nearsighted or experience headaches, blurred vision and the like as a result of excessive close work. These individuals typically overcome their difficulties by wearing "reading" glasses—single focus lenses, the prescription for which, again, is based on a working distance of 406.4 mm (16 inches). Such glasses are usually only worn for close work, and are removed while the individual engages in long or intermediate range activities.

The selection of 406.4 mm (16 inches) as the working distance on which the prescriptions for reading glasses and the lower field of bifocal lenses are based is appropriate, since this distance roughly equals the distance from a person's eyes to a desk top or other surface where reading material or paper work is conventionally placed. The location of the close range prescription in the lower field of the bifocal lenses is also appropriate, since most people place their reading material below eye level and look downward while reading.

However, the advent of the personal computer has brought about a new group of vision problems which are not remedied by conventional bifocal lenses or reading glasses. Typically a computer monitor is placed a distance of about 508 mm (20 inches) to 635 mm (25 inches) away from the operator's eyes, and at a height about equal to eye level. Thus, to maintain clear vision, the operator must lean forward in order to get closer to the 406.4 mm (16 inch) working distance for which his or her glasses have been designed. In addition, if the lenses are bifocal, the operator must tip his or head back so that the lower field of the lenses is aligned with the screen. This puts a considerable strain on the operator's neck and back, in addition to causing headaches, tired eyes, and the like.

Similar problems are experienced by piano players, since their sheet music is typically placed 609.6 mm (24 inches) away from their eyes, and by other individuals whose activities require a second close range of vision, involving distances slightly greater than conventional reading distance.

It would be highly advantageous, therefore, to remedy the foregoing and other deficiencies inherent in the prior art.

Accordingly, it is an object of the present invention to provide an optical device suitable for use by a computer operator or piano player.

Another object of the invention is the provision of a pair of lenses having a working distance in the range of 508 mm (20 inches) to 635 mm (25 inches).

And another object of the invention is to provide a pair of close range lenses covering only the upper portion of a person's field of vision.

Still another object of the invention is the provision of a pair of clip-on, close range lenses which can be mounted on a pair of conventional reading glasses or bifocals.

Yet another object of the invention is to provide a pair of lenses for maintaining clear vision at a working distance of 508 mm (20 inches) to 635 mm (25 inches) in an individual's upper field of vision, while maintaining the individual's normal prescription in the lower field of vision.

Yet still another object of the invention is the provision of a pair of pivotable, clip-on lenses which can be flipped down over a user's eyeglasses while the user works on a computer, and flipped up while the user takes a break or looks in the distance.

And a further object of the invention is to provide a pair of clip-on lenses having a focal center horizontally and vertically aligned with the focal center of the user's normal eyeglasses.

And still a further object of the invention is the provision of a pair of glasses including a frame with an upper rim and a pair of close-range lenses extending approximately 27 mm below the upper rim.

And yet a further object of the invention is to provide a pair of corrective lenses for computer users, the prescription for which is determined solely by the age of the user.

And still a further object of the invention is the provision of corrective lenses, according to the foregoing, which are relatively inexpensive to manufacture and comparatively simple and easy to use.

SUMMARY OF THE INVENTION

Briefly, to achieve the desired objects of the instant invention in accordance with the preferred embodiments thereof, corrective lenses are provided for allowing an individual to clearly view material located at or above eye level, and a distance of approximately 508 mm (20 inches) to approximately 635 mm (25 inches) away.

In a first embodiment of the invention, the lenses are in the form of snap-on, flip-up modifying lenses for mounting over the fixed lenses of a conventional pair of eyeglasses. When in the flipped-down position, the modifying lenses extend from the upper edge of the fixed lenses to slightly below the optical center of the fixed lenses, thus covering only the wearer's upper field of vision. The optical center of the modifying lenses is horizontally and vertically aligned with the optical center of the fixed lenses. The modifying lenses have a positive power in the range of +0.5 to +1.25 Diopter, with the strength of the prescription being based solely on the wearer's age.

In a second embodiment of the invention, designed for individuals who do not ordinarily wear glasses, the lenses are fixed within a more conventional eyeglass frame including a nose bridge-piece and a pair of temple bars. The upper edge of each lens is located above the temple bars, and the lower edge is located approximately 27 mm (1.06 inches) below the bottom edge. Thus, the lenses are only about half the height of conventional glasses and cover only the wearer's upper field of vision. The optical center of each is located from approximately 20 mm (0.787 inches) to approximately 25 mm (0.984 inches) below the upper edge. As in the first embodiment, the lenses have a positive power in the range of +0.5 to +1.25 Diopter, with the strength of the prescription being based solely on the wearer's age.

BRIEF DESCRIPTION OF THE DRAWINGS

The foregoing and further and more specific objects and advantages of the instant invention will become readily apparent to those skilled in the art from the following detailed description of the preferred embodiments thereof taken in conjunction with the drawings in which:

FIG. 1 is a schematic drawing showing a modifying lens according to a first embodiment of the invention coacting with a conventional eyeglass lens.

FIG. 2 is a perspective view showing the modifying lenses according to the first embodiment in flipped down position over a pair of conventional eyeglasses.

FIG. 3 is a fragmentary perspective view showing the modifying lenses in flipped up position.

FIG. 4 is a perspective view, taken from the rear, showing the modifying lenses after removal from the eyeglasses.

FIG. 5 is a fragmentary front view, showing the modifying lenses flipped down over the eyeglasses.

FIG. 6 is a perspective view, similar to FIG. 2, showing an alternative embodiment of the invention.

DETAILED DESCRIPTION OF THE PREFERRED EMBODIMENTS

Turning now to the drawings in which like reference characters indicate corresponding elements throughout the several views, attention is first directed to FIG. 2, which shows a corrective lens adapter according to the present invention, indicated in its entirety by the numeral 10, positioned over a pair of conventional eyeglasses 12.

As is generally well known, eyeglasses 12 comprise a pair of fixed lenses 14 rigidly mounted on opposite sides of a nose bridge-piece 16. A pair of temple bars 18 are provided for supporting the eyeglasses 12 on the wearer's ears. Lenses 14 may be either single focus lenses, formed to provide clear vision within a range of near-point working distances (as in conventional reading glasses), or bifocal lenses, having an upper field of vision formed to provide clear vision at long and intermediate distances, and a lower field of vision formed to provide clear vision within a range of near-point working distances. Each lens 14 includes an upper edge 20 and a lower edge 22, with the distance between the upper and lower edges typically being about 50 mm (1.97 inches).

Each lens 14 has an optical center X, as shown in FIG. 3, located approximately 20 mm (0.787 inches) to 25 mm (0.984 inches) below upper edge 20. If lenses 14 are bifocal, then each lens 14 will also include a second optical center (not shown), located in the wearer's lower field of vision, between optical center X and bottom edge 22. However, for the purpose of clarity, all references to the "optical center" shall be understood to mean the optical center of the wearer's upper field of vision if the lenses are bifocal.

Lens adapter 10 comprises a pair of modifying lenses 24 mounted on opposite sides of a clip 26 of the type found in commercially available clip-on, flip-up sun glasses. Briefly, clip 26 includes a bridge-piece 28, which extends between modifying lenses 24 and defines a horizontal axis, and a pair of hooks 30 for detachably securing the adapter 10 to the upper edge of eyeglasses 12. The modifying lenses 24 are pivotably coupled to the hooks 30 to allow the lenses 24 to rotate from a use position overlapping and coacting with the upper portion of fixed lenses 14, as shown in FIGS. 2 and 5, to a non-use position out of alignment with the fixed lenses 14. Details of the pivotable connection between lenses 24 and hooks 30 can be found in U.S. Pat. No. 3,575,497, which is directed toward the commercially available clip described above.

Each modifying lens 24 includes an upper edge 32 and a lower edge 34. When lens adapter 10 is mounted on eyeglasses 12, the upper edges 32 of the modifying lenses 24 are aligned with and substantially match the shape of upper edge 20 of the corresponding fixed lens 14. Lower edges 34 are straight. The distance between upper edges 32 and lower edges 34 is about 27 mm (1.06 inches). Thus, modifying lenses 24 cover slightly more than the upper half of fixed lenses 14. The lower 15 mm (0.59 inches) to 27 mm (1.06 inches) of the fixed lenses remain uncovered.

The optical center Y of each modifying lens 24 is located approximately 20 mm (0.787 inches) to 25 mm (0.984 inches) below upper edge 32, as shown in FIG. 4, and is horizontally and vertically aligned with optical center X of the corresponding fixed lens 14 when the lens adapter 10 is in its flipped down position, as shown in FIG. 5.

The strength of modifying lenses 24 is selected such that they coact with fixed lenses 14 to provide clear vision at working distances in the range of 508 mm (20 inches) to 635 mm (25 inches). This range, which comprises greater distances than the near-point distances for which fixed lenses 14 were designed, corresponds to the range of distances over which a computer monitor may typically be located relative to the computer operator. Thus, as FIG. 1 shows, an operator wearing eyeglasses 12 and the adapter 10 according to the present invention can clearly and comfortably view a monitor 36 using his or her upper field of vision, while still being able to read a less distant user's manual 38, keyboard 40, or the like, using his or her normal prescription in the lower field of vision. If the wearer needs to rest his or her eyes, or if the lenses 14 are bifocal and he or she needs to look in the distance, it is simply necessary to flip up modifying lenses 24 as shown in FIG. 3, thereby allowing use of the normal prescription in the upper field of vision as well.

The prescription for the modifying lenses 24 can be determined very simply, using the wearer's age as the sole parameter. Other factors, such as astigmatism, prisms, and the like need not be considered, since these will have already been corrected by the prescription for fixed lenses 14. Since the near-point vision of most people deteriorates at a fairly constant rate after about age 41, and then levels off again at around age 53, the amount of correction must be increased every few years between the ages of 41 and 53. In general, the relationship between an individual's age and the amount of power needed to correct their vision at 508 mm (20 inches) to 635 mm (25 inches) is as follows:

| Age (years) | Power (Diopter) |
| --- | --- |
| Up to 41 | +.5 |
| 42–46 | +.75 |
| 47–52 | +1.00 |
| 53 and above | +1.25 |

Other features may also be incorporated into modifying lenses 24 to enhance and protect an individual's vision and improve his or her comfort when operating a computer. For instance, a variety of tints may be added to the lenses 24 to reduce the discomfort associated with operating a computer under bright fluorescent lights. A grey tint has been found to be especially effective for enhancing the visibility of black and white computer monitors, or black screens with green images. Similarly, a pink tint is effective for green screens, and a blue tint is effective for amber screens.

In addition, an anti-reflective coating may be added to reduce the amount of glare and annoying reflections on the screen. An ultraviolet ray blocking coating may be added to protect the eyes from the risks of cataract growth or retinal damage which can arise from prolonged exposure to indoor fluorescent lighting and cathode ray tube emission. A combination of any of the above tints and coatings can be used to dramatically reduce glare and reflection, and to improve the contrast of the computer screen.

A second embodiment of the invention, intended for use by individuals who do not normally require eyeglasses, is illustrated in FIG. 6. In this embodiment, corrective lenses 24' are rigidly secured within a conventional eyeglass frame including nose bridge-piece 16' and temple bars 18'. Each lens 24' includes an upper edge 32' located above temple bars 18' and a straight lower edge 34'. The distance between upper edge 32' and lower edge 34' is approximately 27 mm (1.06 inches). The optical center X' of each lens 24 is located approximately 20 mm (0.787 inches) to approximately 25 mm (0.984 inches) below upper edge 32' and just slightly (2–5 mm) above lower edge 34'. Thus, lenses 24' make up a pair of "half-glasses" covering only the upper portion of the wearer's field of vision. The lower field of vision is uncovered, allowing the wearer to read books and the like with his or her normal, uncorrected vision.

As in the previous embodiment, the prescription for the lenses 24' is selected to provide clear vision at a working distance in the range of approximately 508 mm (20 inches to approximately 635 mm (25 inches). Again, the power of the prescription is dependent solely on the age of the wearer, with the relationship between age and power being the same as in the table for the previous embodiment.

Various modifications and variations to the embodiments herein chosen for purposes of illustration will readily occur to those skilled in the art. To the extent that such variations and modifications do not depart from the spirit of the invention, they are intended to be included within the scope thereof which is assessed only by a fair interpretation of the following claims.

Having fully described and disclosed the instant invention and alternately preferred embodiments thereof in such clear and concise terms as to enable those skilled in the art to understand and practice the same, the invention claimed is:

1. A method for changing the upper-field vision of a person where said person is alternately viewing at least two objects,
    said person having a determinable age,
    one of said objects being in said upper-field of vision of said person and within the range of 508 mm (20 inches) to 635 mm (25 inches) from said person, and
    the other of said objects being in the lower-field of vision of said person and approximately 406.4 mm (16 inches) or less from said person,
    said method comprising the steps of:
    (a) determining the age of said person; and
    (b) adding modifying lenses with a power to said person's upper-field of vision based on said person's age in accordance with the following schedule,

| Age (years) | Power (Diopter) |
| --- | --- |
| Up to 41 | +.5 |
| 42–46 | +.75 |
| 47–52 | +1.00 |
| 53 and above | +1.25 |

2. The method of claim 1 further including the step of adding said power to a pair of glasses.

3. The method of claim 1 further including the step of selectively adding said power to a pair of glasses.

4. The method of claim 1, wherein said modifying lenses are tinted to reduce eye fatigue and discomfort due to computer use, wherein the tint is selected accorded to the color of the computer screen used by the wearer.

5. The method of claim 4, wherein the tint is grey, for enhancing visibility when viewing a black computer screen.

6. The method of claim 4, wherein the tint is pink, for enhancing visibility when viewing a green computer screen.

7. The method of claim 4, wherein the tint is blue, for enhancing visibility when viewing an amber screen.

8. The method of claim 1, wherein said modifying lenses are coated with an anti-reflective coating on said modifying lenses for reducing glare from a computer screen.

9. The method of claim 1, wherein said modifying lenses are coated with a coating for blocking ultraviolet rays from indoor fluorescent lighting and cathode ray tubes.

10. The method of claim 1, wherein the distance between the upper and lower edges of said modifying lenses is approximately 27 mm (1.06 inches).

* * * * *